(12) United States Patent
Zhou (10) Patent No.: US 11,256,019 B2
(45) Date of Patent: Feb. 22, 2022

(54) BACKLIGHT MODULE AND DISPLAY DEVICE

(71) Applicant: WUHAN CHINA STAR OPTOELECTRONICS TECHNOLOGY CO., LTD, Hubei (CN)

(72) Inventor: Zheng Zhou, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 21 days.

(21) Appl. No.: 16/613,432

(22) PCT Filed: Sep. 19, 2019

(86) PCT No.: PCT/CN2019/106725
§ 371 (c)(1),
(2) Date: Nov. 14, 2019

(87) PCT Pub. No.: WO2020/248422
PCT Pub. Date: Dec. 17, 2020

(65) Prior Publication Data
US 2020/0393608 A1 Dec. 17, 2020

(30) Foreign Application Priority Data
Jun. 14, 2019 (CN) .......................... 201910515253.5

(51) Int. Cl.
*F21V 8/00* (2006.01)
(52) U.S. Cl.
CPC ........... *G02B 6/0045* (2013.01); *G02B 6/005* (2013.01)
(58) Field of Classification Search
CPC .............................. G02B 6/0045; G02B 6/005
See application file for complete search history.

(56) References Cited

U.S. PATENT DOCUMENTS

| | | | |
|---|---|---|---|
| 2015/0226898 A1* | 8/2015 | Shih | G02B 6/0068 362/608 |
| 2016/0238774 A1* | 8/2016 | Koike | G02B 6/005 |
| 2017/0139101 A1* | 5/2017 | Lee | G02B 6/0055 |
| 2017/0153378 A1* | 6/2017 | Lee | G02B 6/005 |
| 2017/0307798 A1* | 10/2017 | Hikmet | G02B 6/005 |
| 2018/0031875 A1* | 2/2018 | Qin | G02F 1/133615 |
| 2018/0149807 A1* | 5/2018 | Seo | G02B 6/005 |
| 2019/0129254 A1* | 5/2019 | Moon | G02F 1/133617 |

* cited by examiner

*Primary Examiner* — Kevin Quarterman
(74) *Attorney, Agent, or Firm* — Mark M. Friedman (57) ABSTRACT

The present application provides a backlight module and a display device. The backlight module includes a substrate, a light source on the substrate, and a light guide plate on a side of the light source. The light guide plate includes a first region located at a periphery area of the light guide plate. At least one protrusion is disposed in the first region. A thickness of the at least one protrusion gradually increases along a direction from the light source to the light guide plate.

18 Claims, 5 Drawing Sheets

BACKLIGHT MODULE AND DISPLAY DEVICE

FIELD OF INVENTION

The present application relates to the field of display, and more particularly to a backlight module and a display device.

BACKGROUND

Liquid Crystal Display (LCD) is the most widely used display product on the market, especially for in-vehicle displays.

With development of in-vehicle liquid crystal displays, in-vehicle displays tend to be narrow-frame designs. In the existing narrow-frame display, the light guide plate in the backlight module is fixed to corresponding optical films by disposing steps, and the distance between the steps and the display area of the display is rather small, resulting in technical problems such as partial bright spots and bright lines on the display at a wide viewing angle that affect the quality of the display.

Therefore, there is a need for a backlight module to solve the above technical problems.

SUMMARY

The present application provides a backlight module and a display device to solve the technical problems such as partial bright spots and bright lines of the display under a large viewing angle.

To solve the above problems, the present application provides the following technical solutions:

The present application provides a backlight module, comprising a substrate, a light source on the substrate, and a light guide plate on a side of the light source.

The light guide plate comprises a first region located at a periphery area of the light guide plate.

At least one protrusion is disposed in the first region.

A thickness of the at least one protrusion gradually increases along a direction from the light source to the light guide plate.

In the backlight module of the present application, the light guide plate comprises at least a first protrusion and a second protrusion over a light-output surface of the light guide plate.

The maximum thickness of the first protrusion is smaller than the minimum thickness of the second protrusion.

The first protrusion is disposed near the light source, and the second protrusion is disposed away from the light source.

In the backlight module of the present application, the first protrusion comprises a first plane away from the light-output surface of the light guide plate.

The second protrusion comprises a second plane away from the light-output surface of the light guide plate.

The first plane is connected to the second plane by a first inclined surface.

In the backlight module of the present application, the first plane and the second plane are parallel to the light-output surface of the light guide plate.

In the backlight module of the present application, the first inclined surface and the light-output surface of the light guide plate are disposed at a first included angle.

The first included angle is 30° to 60°.

In the backlight module of the present application, the backlight module further comprises at least one first optical film over the light-output surface of the light guide plate.

The at least one first optical film covers a region of the light guide plate that is not covered by the protrusions, and a thickness of the first optical film is the same as the thickness of the first protrusion.

In the backlight module of the present application, the backlight module further comprises at least one second optical film over the first optical film.

The second optical film covers a region of the light guide plate not covered by the second protrusion, and a sum of the thickness of the first optical film and a thickness of the second optical film equals to a thickness of the second protrusion.

In the backlight module of the present application, the first optical film is attached to the light guide plate by a first adhesive layer, and the second optical film is attached to the first protrusion by a second adhesive layer.

In the backlight module of the present application, the first adhesive layer and the second adhesive layer comprise a double-sided tape or a glue.

In the backlight module of the present application, the light guide plate further comprises a third protrusion disposed away from the first protrusion.

The third protrusion comprises a third plane parallel to the light-output surface of the light guide plate.

The third plane is connected to the second plane by a second inclined surface.

The second inclined surface is parallel to the first inclined surface.

The present application further provides a display device, comprising a backlight module and a display module over the backlight module.

The display device comprises a display area and a non-display area located at a periphery of the display area, and a first region is disposed in the non-display area.

The backlight module comprises a substrate, a light source on the substrate, and a light guide plate on a side of the light source.

The light guide plate comprises a first region located at a periphery area of the light guide plate.

At least one protrusion is disposed in the first region.

A thickness of the at least one protrusion gradually increases along a direction from the light source to the light guide plate.

In the display device of the present application, the light guide plate comprises at least a first protrusion and a second protrusion over a light-output surface of the light guide plate.

The maximum thickness of the first protrusion is smaller than the minimum thickness of the second protrusion.

The first protrusion is disposed near the light source, and the second protrusion is disposed away from the light source.

In the display device of the present application, the first protrusion comprises a first plane away from the light-output surface of the light guide plate.

The second protrusion comprises a second plane away from the light-output surface of the light guide plate.

The first plane is connected to the second plane by a first inclined surface.

In the display device of the present application, the first plane and the second plane are parallel to the light-output surface of the light guide plate.

In the display device of the present application, the first inclined surface and the light-output surface of the light guide plate are disposed at a first included angle.

The first included angle is 30° to 60°.

In the display device of the present application, the backlight module further comprises at least one first optical film over the light-output surface of the light guide plate.

The at least one first optical film covers a region of the light guide plate that is not covered by the protrusions, and a thickness of the first optical film is the same as the thickness of the first protrusion.

In the display device of the present application, the backlight module further comprises at least one second optical film over the first optical film.

The second optical film covers a region of the light guide plate not covered by the second protrusion, a sum of the thickness of the first optical film and a thickness of the second optical film equals to a thickness of the second protrusion.

In the display device of the present application, the first optical film is attached to the light guide plate by a first adhesive layer, and the second optical film is attached to the first protrusion by a second adhesive layer.

In the display device of the present application, the first adhesive layer and the second adhesive layer comprise a double-sided tape or a glue.

In the display device of the present application, the light guide plate further comprises a third protrusion disposed away from the first protrusion.

The third protrusion comprises a third plane parallel to the light-output surface of the light guide plate.

The third plane is connected to the second plane by a second inclined surface.

The second inclined surface is parallel to the first inclined surface.

Advantageous effects: Technical problems such as partial bright spots and bright lines of the display under a large viewing angle of a display corresponding to a backlight module of the present application are solved and the quality of the products are improved through performing a beveling treatment on the connection of adjacent protrusions on the light-guide plate, thereby avoiding specular reflection when the light source passes through the connection.

BRIEF DESCRIPTION OF DRAWINGS

To detail explain the technical schemes of the embodiments or existing techniques, drawings that are used to illustrate the embodiments or existing techniques are provided. Apparently, the illustrated embodiments are just a part of those of the present disclosure. It is easy for any person having ordinary skill in the art to obtain other drawings without labor for inventiveness.

DETAILED DESCRIPTION

The following description of the various embodiments is provided to illustrate the specific embodiments. Directional terms mentioned in this application, such as "upper", "lower", "front", "rear", "left", "right", "inside", "outside", "side", etc., are only illustrations of the drawings. Therefore, the directional terminology is used for the purpose of illustration and understanding, but not intended to be limiting. In the figures, elements of similar structures are assigned with the same reference numerals.

Figure 1:
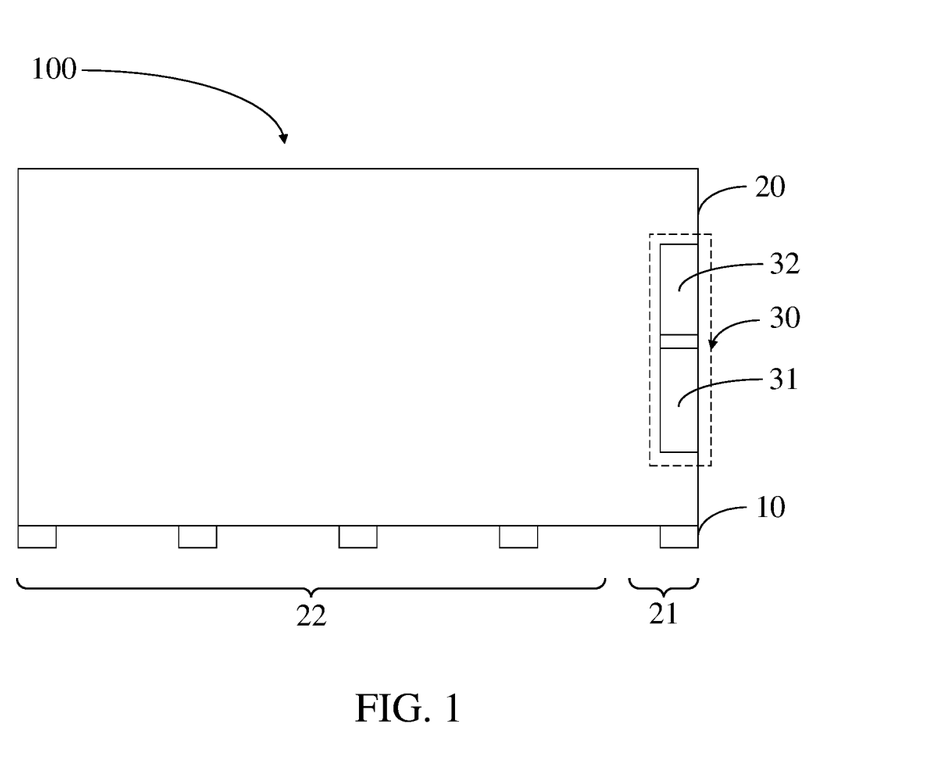
FIG. 1 is a first structural diagram of a backlight module of the present application.

FIG. 1 is a first structural diagram of a backlight module of the present application.

The backlight module 100 comprises a substrate, a light source 10 on the substrate, and a light guide plate 20 on a side of the light source 10.

In one embodiment, the substrate can be composed of a sheet-metal material.

In one embodiment, the light source 10 can be a light-emitting diode (LED) lamp. The backlight module 100 of the present application is provided with a plurality of LED lamps, and the spacing between two adjacent LED lamps is equal. The number of LED lamps is not specifically limited in this application.

The light guide plate is disposed on the sheet-metal substrate, and is disposed on the same plane as the light source 10. The light guide plate 20 is disposed on the entire plane in the backlight module 100.

In one embodiment, the light guide plate 20 comprises a first region 21 and a second region 22.

The first region 21 corresponds to a non-display area in a display corresponding to the backlight module 100, and the second region 22 corresponds to a display area in the display corresponding to the backlight module 100.

The light guide plate 20 further comprises at least one protrusion 30 located in the first region 21. The protrusion 30 is integrally provided with the light guide plate 20. In one embodiment, the protrusion 30 is configured to secure an optical film over the light guide plate 20.

The side surface of the protrusion 30 is on the same plane as the side surface of the light guide plate 20.

The first region 21 is disposed near an edge of the light guide plate 20 and may be disposed on any edge of the light guide plate 20, which is not specifically limited herein.

In one embodiment, a thickness of the protrusion 30 gradually increases along a direction from the light source 10 to the light guide plate 20.

Referring to FIG. 1, the light guide plate 20 at least comprises a first protrusion 31 and a second protrusion 32 over a light-output surface 23 of the light guide plate. The first protrusion 31 and the second protrusion 32 are arranged in a step-like configuration.

In one embodiment, the maximum thickness of the first protrusions 31 is less than the minimum thickness of the second protrusions 32.

In one embodiment, the first protrusion 31 is disposed near the light source 10, and the second protrusion 32 is disposed away from the light source 10.

Figure 2:
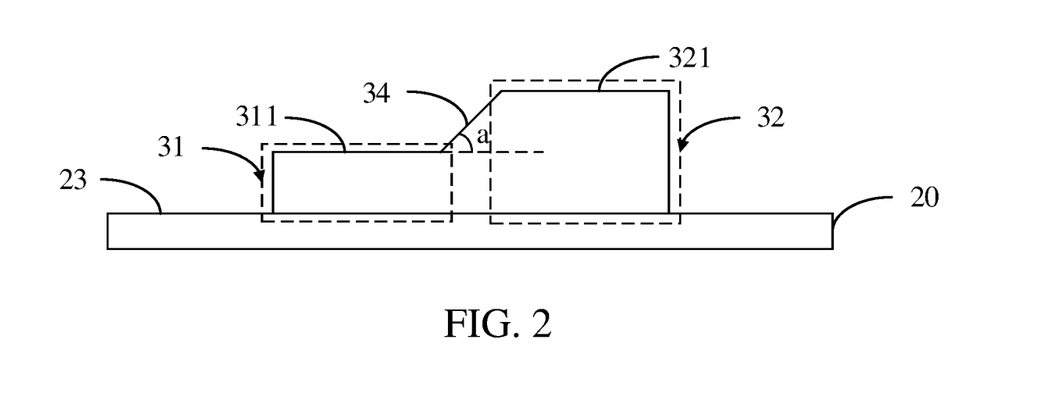
FIG. 2 is a first sideview of a light guide plate of the backlight module of the present application.

Referring to FIG. 2, FIG. 2 is a first sideview of a light guide plate of the backlight module of the present application.

The first protrusion 31 comprises a first plane 311 away from the light-output surface 23 of the light guide plate.

The second protrusion 32 comprises a second plane 321 away from the light-output surface 23 of the light guide plate.

The first plane 311 is connected to the second plane 321 by a first inclined surface 34.

In one embodiment, the first plane 311 and the second plane 321 are disposed in parallel to the light-output surface 23 of the light guide plate.

Figure 3:
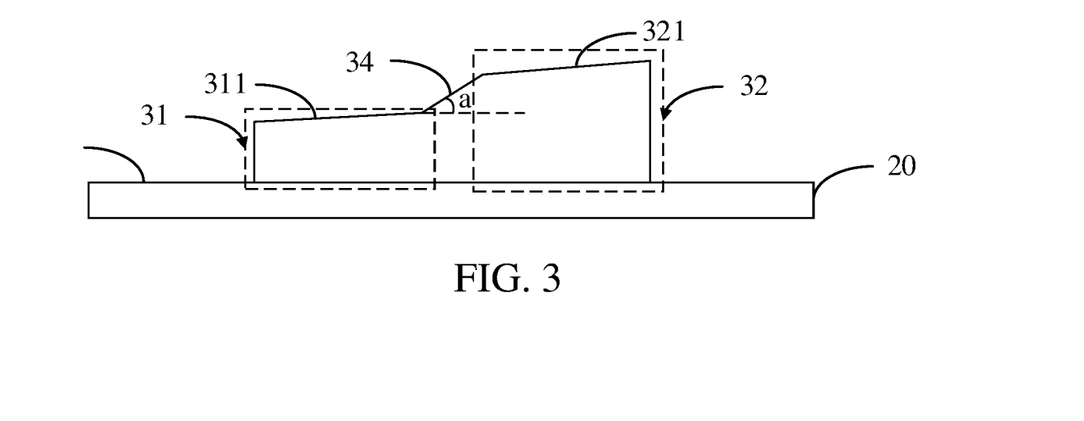
FIG. 3 is a second sideview of a light guide plate of the backlight module of the present application.

Referring to FIG. 3, FIG. 3 is a second sideview of a light guide plate of the backlight module of the present application.

The first plane 311 and the second plane 321 can be disposed in non-parallel to the light-output surface 23 of the light guide plate. The first plane 311 and the second plane 321 can be disposed at an inclined angle.

In one embodiment, the thickness of the first protrusion 31 and the second protrusion 32 gradually increases along a direction from the light source 10 to the light guide plate 20. An included angle between the first plane 311 and the light-output surface 23 of the light guide plate can be smaller than an included angle between the second plane 321 and the light-output surface 23 of the light guide plate.

In one embodiment, the thickness of the first protrusion 31 and the second protrusion 32 can be linearly increased. A specific linear equation can be obtained according to a specific experiment and is not described in detail in this application.

Referring to FIG. 2 and FIG. 3, the first inclined surface 34 and the light-output surface 23 of the light guide plate are disposed at a first included angle a.

In one embodiment, the first angle a can be 30°~60°.

Hereinafter, 45° is used as an example for illustration for the first included angle.

The incident light from the LED lamps enters the light guide plate 20, and is reflected by the reflective layer and the mesh points of the bottom layer of the light guide plate 20 to the light-output surface of the light guide plate 20. When a portion of the light passes through the boundary between the first protrusion 31 and the second protrusion 32, the conventional junction is a right angle connection, and mirror emission easily occurs when the light passes through this vertical surface, resulting in occurrence of partial bright spots or bright lines when observing the display corresponding to the backlight module 100 of the present application at a wide viewing angle. The present application replaces a vertical surface between the first protrusion 31 and the second protrusion 32 with an inclined surface, and the mirror reflection effect disappears when the incident light passes through the inclined surface, thereby eliminating technical problems of local bright spots or bright lines occurring on the display corresponding to the backlight module 100 of the present application when observed at a wide viewing angle.

The backlight module 100 further comprises at least one optical film over the light guide plate 20.

Figure 4:
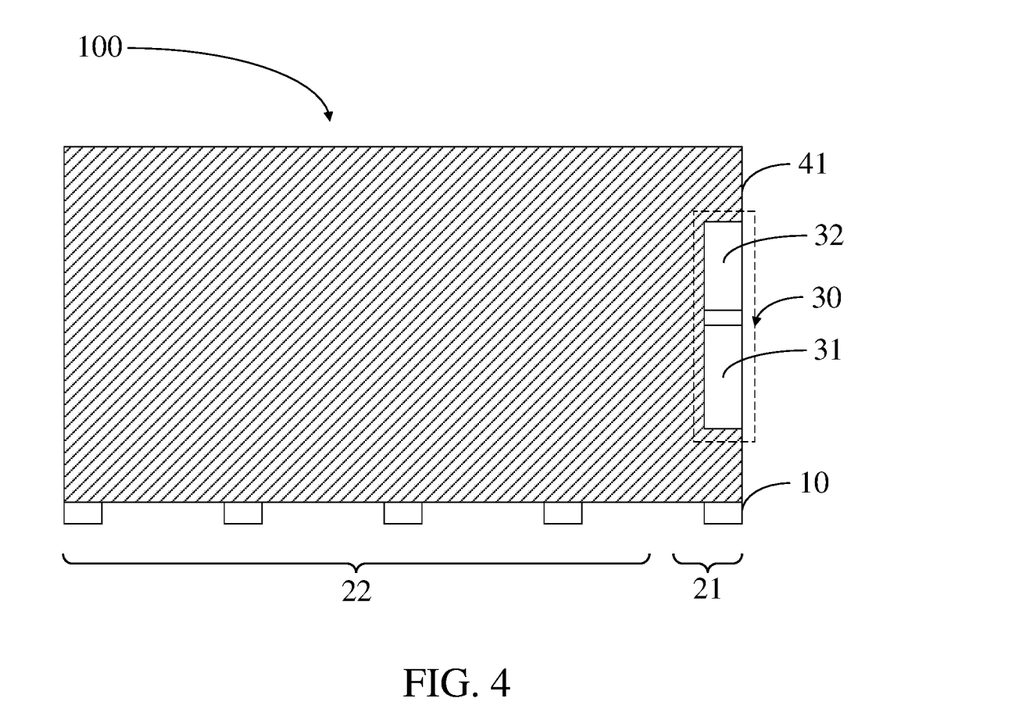
FIG. 4 is a second structural diagram of a backlight module of the present application.

Referring to FIG. 4, FIG. 4 is a second structural diagram of a backlight module of the present application.

The backlight module 100 further comprises at least one first optical film 41 over the light-output surface 23 of the light guide plate. The first optical film 41 covers a region of the light guide plate 20 that is not covered by the protrusion 30

Figure 5:
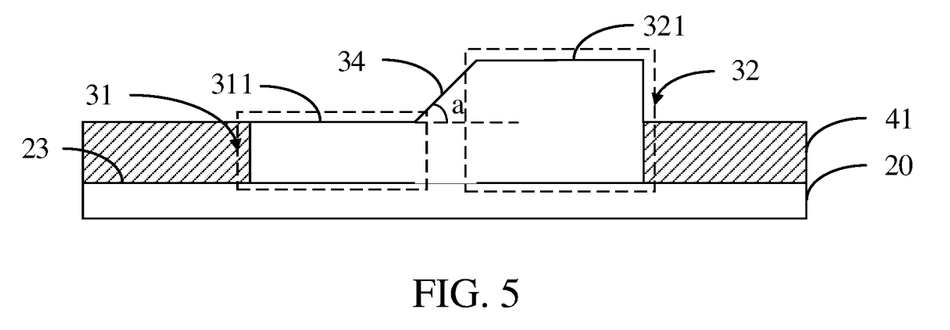
FIG. 5 is a sideview of FIG. 4.

Referring to FIG. 5, FIG. 5 is a sideview of FIG. 4.

A thickness of the first optical film 41 is the same as the thickness of the first protrusion 31.

In one embodiment, the thickness and the number of the first optical film 41 are not specifically limited herein. It suffices that the thickness of the first optical film 41 is the same as the thickness of the first protrusion 31.

In one embodiment, the first protrusion 31 and the first optical film 41 can be engaged by an inclined surface. The included angle of the inclined surface can be specifically referred to the first included angle a. In order to ensure the effectiveness of the first optical film 41 to engage with the first protrusion 31, the junction of the first optical film 41 and the first protrusion 31 is disposed on an inclined surface.

In one embodiment, the first optical film 41 can be one of a brightness enhancement sheet, a diffusion sheet, or a prism film.

In one embodiment, the first optical film 41 is attached to the light guide plate 20 by a first adhesive layer to prevent displacement of the first optical film 41.

In one embodiment, the first adhesive layer may be double-sided tape or glue, etc., and the present application is not specifically limited thereto.

Figure 6:
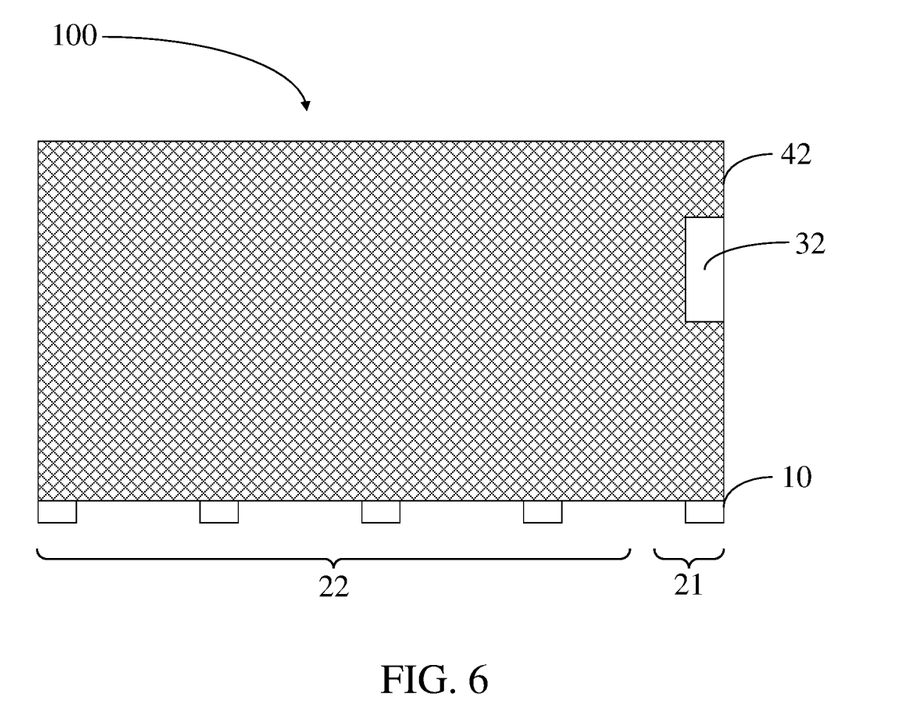
FIG. 6 is a third structural diagram of a backlight module of the present application.

Referring to FIG. 6, FIG. 6 is a third structural diagram of a backlight module of the present application.

The backlight module 100 further comprises at least one second optical film 42 over the first optical film 41. The second optical film 42 covers a region of the light guide plate 20 not covered by the second protrusion 32.

Figure 7:
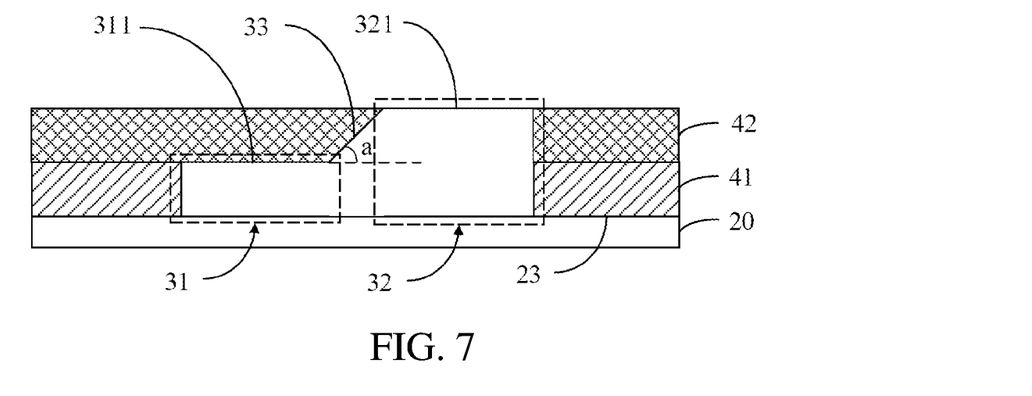
FIG. 7 is a sideview of FIG. 6.

Referring to FIG. 7, FIG. 7 is a sideview of FIG. 6.

A sum of the thickness of the first optical film 41 and a thickness of the second optical film 42 equals to a thickness of the second protrusion 32. The thickness of the second optical film 42 is the same as the thickness difference between the first protrusion 31 and the second protrusion 32.

In one embodiment, the thickness and the number of the second optical film 42 are not specifically limited herein. It suffices that the surface of the second optical film 42 away from the light guide plate 20 and the second plane 321 of the second protrusion 32 are on the same plane.

In one embodiment, the second protrusion 32 and the second optical film 42 are connected by the first inclined surface 34. In order to ensure the effectiveness of connection between the second optical film 42 and the second protrusion 32, the junction of the second optical film 42 and the second protrusion 32 is disposed on an inclined surface, and the specific inclined angle can be referred to the inclined angle of the first inclined surface 34.

In one embodiment, the second optical film 42 can be one of a brightness enhancement sheet, a diffusion sheet, or a prism film.

In an embodiment, the second optical film 42 is attached to the second protrusion 32 of the light guide plate 20 by a second adhesive layer to prevent displacement of the second optical film 42.

In one embodiment, the second adhesive layer can be a double-sided tape or a glue, etc., but is not limited thereto.

Figure 8:
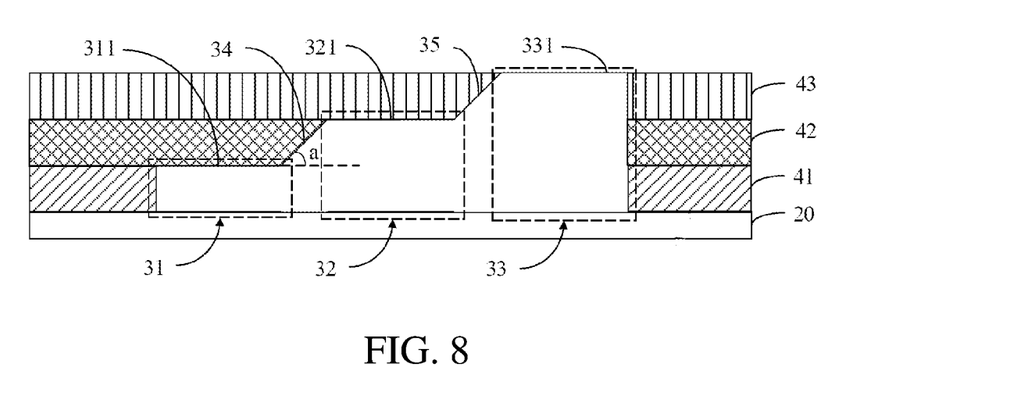
FIG. 8 is a second sideview of a light guide plate of the backlight module of the present application.

Referring to FIG. 8, FIG. 8 is a second sideview of a light guide plate of the backlight module of the present application.

The light guide plate 20 further comprises a third protrusion 33 disposed away from the first protrusion 31.

In one embodiment, the minimum thickness of the third protrusion 33 is less than the maximum thickness of the second protrusion 32.

The third protrusion 33 can comprise a third plane 331 parallel to the light-output surface 23 of the light guide plate. In one embodiment, the third plane 331 may be disposed in non-parallel to the light-output surface 23 of the light guide plate. For example, the first plane 311 or the second plane 321 in FIG. 3 has a certain inclined angle. Alternatively, the thickness of the third protrusion 33 is linearly increased.

The light guide plate 20 further comprises a second inclined surface 35 that connects the third plane 331 and the second plane 321.

In an embodiment, the second inclined surface 35 may be disposed in parallel to the first inclined surface 34.

In an embodiment, the second inclined surface 35 may be disposed in non-parallel to the first inclined surface 34.

Figure 9:
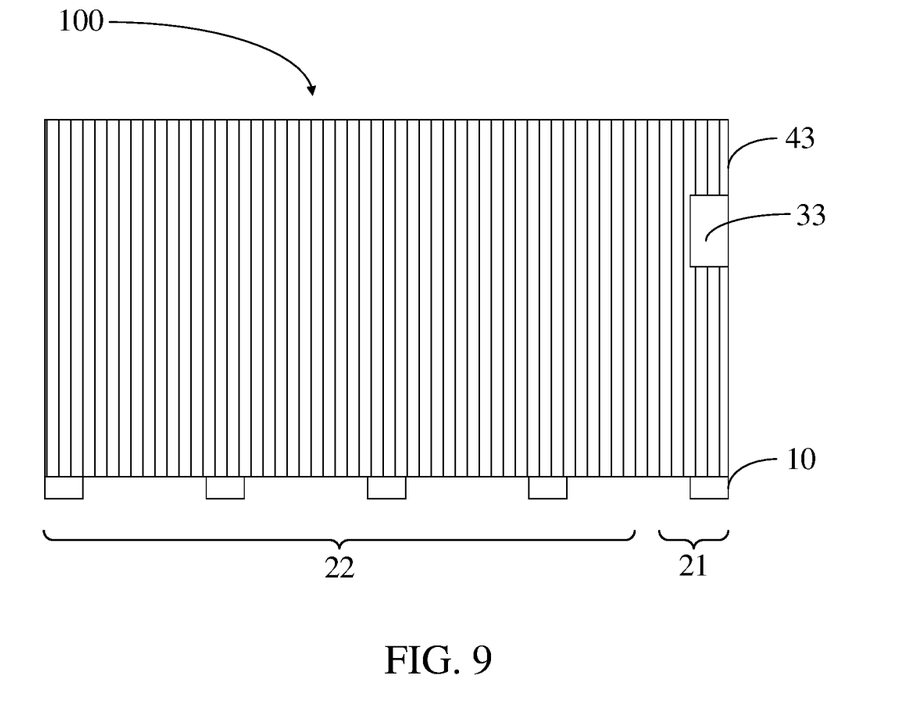
FIG. 9 is a top view of FIG. 8.

Referring to FIG. 9, FIG. 9 is a top view of FIG. 8.

The backlight module 100 further comprises at least one third optical film 43 over the second optical film 42. The third optical film 43 covers a region of the light guide plate 20 that is not covered by the third protrusion 33.

Referring to FIG. 8 and FIG. 9, the sum of the thickness of the first optical film 41, the second optical film 42, and the third optical film 43 is the same as the thickness of the third protrusion 33. The thickness of the third optical film 43 is the same as the thickness difference between the third protrusion 33 and the second protrusion 32.

In one embodiment, the thickness and the number of the third optical film 43 are not specifically limited herein. It suffices that the surface of the third optical film 43 away from the light guide plate 20 and the third plane 331 of the third protrusion 33 are on the same plane.

In one embodiment, the third protrusion 33 and the third optical film 43 are connected by the second inclined surface 35. In order to ensure the effectiveness of connection of the third optical film 43 and the third protrusion 33, the connection between the third optical film 43 and the third protrusion 33 is disposed on an inclined surface, and the specific inclined angle can be referred to the inclined angle of the second inclined surface 35.

In one embodiment, the third optical film 43 can be one of a brightness enhancement sheet, a diffusion sheet, or a prism film.

In one embodiment, the first optical film 41, the second optical film 42, and the third optical film 43 are different.

In one embodiment, the third optical film 43 is adhered to the third protrusion 33 of the light guide plate 20 through a third adhesive layer to prevent displacement of the third optical film 43.

In one embodiment, the third adhesive layer can be a double-sided tape or a glue, and the present application is not specifically limited thereto.

The backlight module 100 may further comprises a fourth protrusion 30, a fifth protrusion 30, and the like over the light guide plate 20. The specific number is not limited in the application.

In the above embodiment, an optical film corresponds to one protrusion 30. When the number of the protrusion 30 is greater than the type of the optical film, an optical film may correspond to a plurality of protrusions 30. The specific arrangement is not limited in this application.

Figure 10:
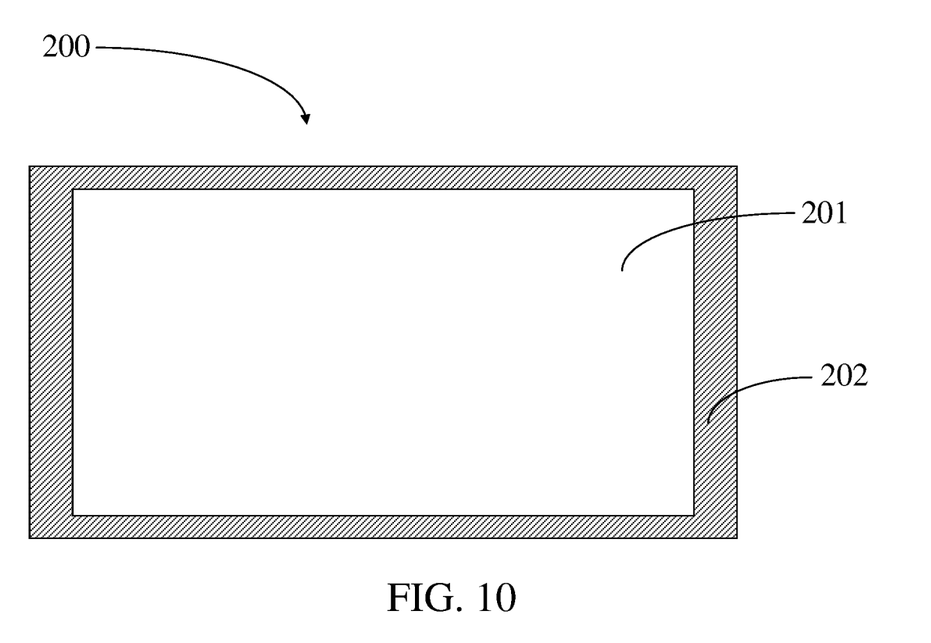
FIG. 10 is a structural diagram of a display device of the present application.

Referring to FIG. 10, FIG. 10 is a structural diagram of a display device of the present application.

The display device 200 comprises a backlight module and a display module over the backlight module. The structure and the working principle of the backlight module are the same as or similar to the above embodiments, and are not described herein again.

The display device 200 comprises a display area 201 and a non-display area 202 located at the periphery of the display area. In one embodiment, the first region 21 of the light guide plate 20 is located within the non-display area 202. The protrusions 30 in the light guide plate 20 are located in the non-display area 202 of the display device 100.

The present application provides a backlight module and a display device. The backlight module comprises a substrate, a light source on the substrate, and a light guide plate on a side of the light source. The light guide plate comprises a first region located at a periphery area of the light guide plate, and at least one protrusion is disposed in the first region. A thickness of the at least one protrusion gradually increases along a direction from the light source to the light guide plate.

The present application performs an inclined surface treatment on the connection of adjacent protrusions over the light guide plate, thereby preventing mirror reflection when the light source passes through the connection, and eliminating technical problems such as local bright spots or bright lines occurring on the display corresponding to the backlight module at a wide viewing angle, and improving the quality of the products.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:

1. A backlight module, comprising a substrate, a light source on the substrate, and a light guide plate on a side of the light source;
   wherein the light guide plate comprises a first region located at a periphery area of the light guide plate;
   wherein the light guide plate at least comprises a first protrusion and a second protrusion over a light-output surface of the light guide plate in the first region, and a maximum thickness of the first protrusion is less than a minimum thickness of the second protrusion; and
   wherein the first protrusion is disposed near the light source, and the second protrusion is disposed away from the light source.

2. The backlight module of claim 1, wherein:
   the first protrusion comprises a first plane away from the light-output surface of the light guide plate;
   the second protrusion comprises a second plane away from the light-output surface of the light guide plate; and
   the first plane is connected to the second plane by a first inclined surface.

3. The backlight module of claim 2, wherein:
   the first plane and the second plane are parallel to the light-output surface of the light guide plate.

4. The backlight module of claim 2, wherein:
   the first inclined surface and the light-output surface of the light guide plate are disposed at a first included angle; and
   the first included angle is 30° to 60°.

5. The backlight module of claim 1, wherein the backlight module further comprises at least one first optical film over the light-output surface of the light guide plate; and
   the at least one first optical film covers a region of the light guide plate that is not covered by the first protrusion and the second protrusion, and a thickness of the first optical film is the same as a thickness of the first protrusion.

6. The backlight module of claim 5, wherein the backlight module further comprises at least one second optical film over the first optical film; and
   the second optical film covers a region of the light guide plate not covered by the second protrusion, and a sum of the thickness of the first optical film and a thickness of the second optical film equals to a thickness of the second protrusion.

7. The backlight module of claim 6, wherein:
the first optical film is attached to the light guide plate by a first adhesive layer, and the second optical film is attached to the first protrusion by a second adhesive layer.

8. The backlight module of claim 7, wherein:
the first adhesive layer and the second adhesive layer comprise a double-sided tape or a glue.

9. The backlight module of claim 2, wherein:
the light guide plate further comprises a third protrusion disposed away from the first protrusion;
the third protrusion comprises a third plane parallel to the light-output surface of the light guide plate;
the third plane is connected to the second plane by a second inclined surface; and
the second inclined surface is parallel to the first inclined surface.

10. A display device, comprising a backlight module and a display module over the backlight module;
wherein the display device comprises a display area and a non-display area located at a periphery of the display area, and a first region is disposed in the non-display area;
the backlight module comprises a substrate, a light source on the substrate, and a light guide plate on a side of the light source;
the light guide plate comprises a first region located at a periphery area of the light guide plate;
wherein the light guide plate at least comprises a first protrusion and a second protrusion over a light-output surface of the light guide plate in the first region, and a maximum thickness of the first protrusion is less than a minimum thickness of the second protrusion; and
wherein the first protrusion is disposed near the light source, and the second protrusion is disposed away from the light source.

11. The display device of claim 10, wherein:
the first protrusion comprises a first plane away from the light-output surface of the light guide plate;
the second protrusion comprises a second plane away from the light-output surface of the light guide plate; and
the first plane is connected to the second plane by a first inclined surface.

12. The display device of claim 11, wherein:
the first plane and the second plane are parallel to the light-output surface of the light guide plate.

13. The display device of claim 11, wherein:
the first inclined surface and the light-output surface of the light guide plate are disposed at a first included angle; and
the first included angle is 30° to 60°.

14. The display device of claim 10, wherein the backlight module further comprises at least one first optical film over the light-output surface of the light guide plate; and
the at least one first optical film covers a region of the light guide plate that is not covered by the first protrusion and the second protrusion, and a thickness of the first optical film is the same as a thickness of the first protrusion.

15. The display device of claim 14, wherein the backlight module further comprises at least one second optical film over the first optical film; and
the second optical film covers a region of the light guide plate not covered by the second protrusion, and a sum of the thickness of the first optical film and a thickness of the second optical film equals to a thickness of the second protrusion.

16. The display device of claim 15, wherein:
the first optical film is attached to the light guide plate by a first adhesive layer, and the second optical film is attached to the first protrusion by a second adhesive layer.

17. The display device of claim 16, wherein:
the first adhesive layer and the second adhesive layer comprise a double-sided tape or a glue.

18. The display device according to claim 11, wherein:
the light guide plate further comprises a third protrusion disposed away from the first protrusion;
the third protrusion comprises a third plane parallel to the light-output surface of the light guide plate;
the third plane is connected to the second plane by a second inclined surface; and
the second inclined surface is parallel to the first inclined surface.

* * * * *